United States Patent [19] [11] 3,757,291
Lilly [45] Sept. 4, 1973

[54] TRAFFIC CONTROL DEVICE

[76] Inventor: Glenford Lilly, 1728 W. Argon St., Mesa, Ariz. 85201

[22] Filed: May 18, 1972

[21] Appl. No.: 254,562

[52] U.S. Cl. .................... 340/41 A, 340/22, 340/45, 340/120

[51] Int. Cl. .................... G08g 1/095

[58] Field of Search .................... 340/22, 41, 41 A, 340/42, 45, 49, 51, 114 B, 121, 130, 131, 122, 123, 127, 128, 129; 116/63

[56] References Cited

UNITED STATES PATENTS

| | | | |
|---|---|---|---|
| 1,704,595 | 3/1929 | Edwards | 116/63 R |
| 1,594,312 | 7/1926 | Martin | 116/63 R |

FOREIGN PATENTS OR APPLICATIONS

| | | | |
|---|---|---|---|
| 324,221 | 1/1930 | Great Britain | 340/130 |

*Primary Examiner*—William C. Cooper
*Assistant Examiner*—Randall P. Myers
*Attorney*—Warren F. B. Lindsley

[57] ABSTRACT

A traffic control device using a pair of movable arms, four signal lights, a rotating beacon, a siren and a plurality of flashing lights to provide normal traffic control or programable supplemental control, synchronized with the regular traffic lights or operable alone. The device can be either portable or fixed in position, and employs a built-in electronic siren which together with additional controls in emergency situations provides programable traffic control.

11 Claims, 16 Drawing Figures

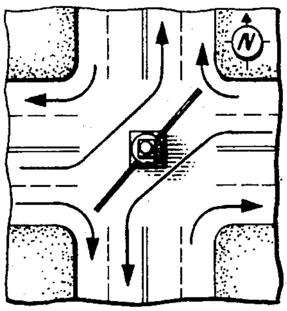
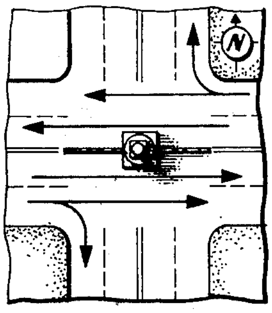
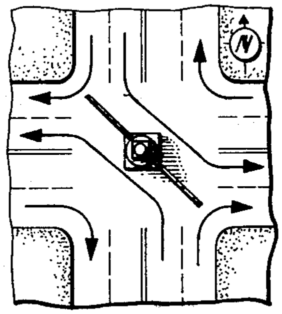
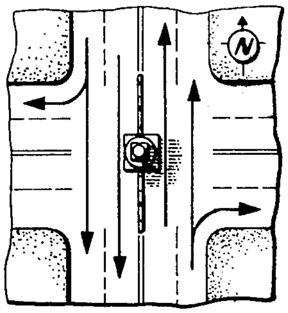

FIG. 5b FIG. 5c FIG. 5d FIG. 5e

| STEP | POSITION OF ARMS (SEE FIG. NUMBER INDICATED) | COLOR OF LIGHT SHOWN TO TRAFFIC LANE INDICATED BELOW | | | | BEACON LIGHT ON, ARM LIGHTS FLASH (▲) |
|---|---|---|---|---|---|---|
| | | NORTH | SOUTH | EAST | WEST | |
| 1 | *(MOVING)* | R | R | R | R | ▲ |
| 2 | 5b | R | R | L | L | |
| 3 | *(MOVING)* | R | R | R | R | ▲ |
| 4 | 5c | R | R | G | G | |
| 5 | 5c | R | R | Y | Y | |
| 6 | *(MOVING)* | R | R | R | R | ▲ |
| 7 | 5d | L | L | R | R | |
| 8 | *(MOVING)* | R | R | R | R | ▲ |
| 9 | 5e | G | G | R | R | |
| 10 | 5e | Y | Y | R | R | |
| | EMERGENCY | R | R | R | R | ▲ |

*LEGEND:* R = RED Y = YELLOW G = GREEN L = LEFT TURN ONLY (ARROW)
EMERGENCY = EMERGENCY VEHICLES EN ROUTE; DAMAGE TO EQUIPMENT, ETC.

FIG. 5a

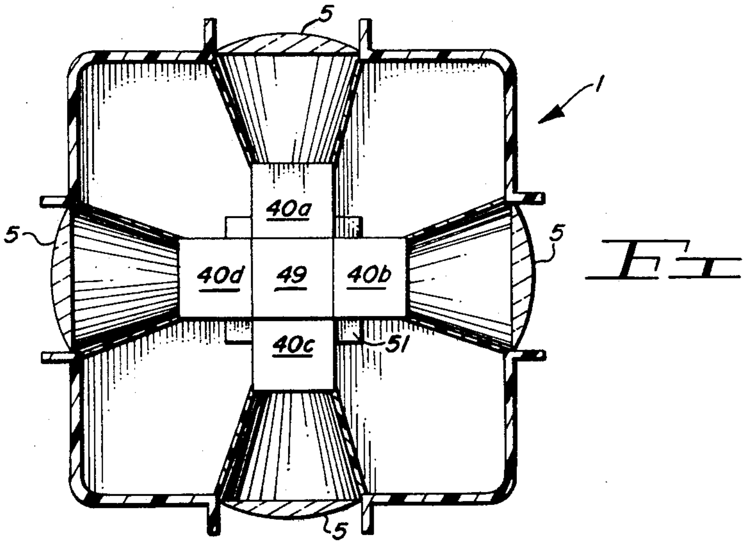

FIG. 6

TRAFFIC CONTROL DEVICE

BACKGROUND OF THE INVENTION

The present invention pertains to a self-contained traffic control device and more particularly to a control device which uses movable arms and signal lights to aid in controlling the flow of traffic. The device may be portable or permanently installed at a traffic intersection, and synchronized with or supplemental to the regular traffic lights for additional traffic control.

DESCRIPTION OF THE PRIOR ART

The commonly used electric traffic signal lights direct traffic flow by colored lights which signal "stop," "go," or "use caution," and are adequate during normal traffic conditions, but may not be adequate during rush hours or under certain emergency conditions. In many areas policemen are used to replace these traffic lights during rush hours and emergencies to control traffic. Often a shortage of policemen and the extra costs involved prohibit their use in many areas where extra control of traffic is needed. The present invention provides extra control of traffic with a minimum of cost.

SUMMARY OF THE INVENTION

The present invention is a compact traffic control device which can be synchronized with the reqular traffic lights to provide additional control of traffic and can be used to provide signals in emergency situations. The device is a self-contained, portable device, quickly movable into position and installed or temporarily placed in operation for emergency use only. The device has built-in emergency signal equimpent to provide a siren and flashing lights during an emergency and employs a programable timer, automatically operable during the rush hours each day. The device has built-in controls so that it can be operated from a remote location or can be operated by use of controls inside the device.

It is, therefore, an object of this invention to provide a new and improved traffic control device.

Another object of this invention is to provide a traffic control device having synchronized signal lights and movable arms for directing traffic.

A further object of this invention is to provide a supplementary traffic control device which is synchronized with the commonly used traffic lights during the busy portion only of the day.

A still further object of this invention is to provide a supplementary traffic control device which automatically operates in a programmed manner upon receiving signals from outside its self-contained configuration.

A still further object of this invention is to provide a portable traffic control device which can be quickly installed to direct traffic and quickly removed when desired.

A still further object of this invention is to provide a traffic control device which can be controlled from a remote location.

The foregoing objects are achieved in accordance with one embodiment of the present invention by a traffic control device employing two movable arms to aid in controlling traffic flow. The arms can be moved up and down and also can be rotated about the device. Colored lights on four sides provide, together with rotating and flashing red lights and a siren, emergency signal possibilities.

Other objects and advantages of the present invention will become apparent from the following description when taken in connection with the accompanying drawings.

BRIEF DESCRIPTION OF THE DRAWINGS

The present invention may be more readily described by reference to the accompanying drawing, in which:

FIGS. 5a, 5b, 5c, 5d, and 5e illustrate the sequence of operation of the present invention;

FIG. 6 is a top horizontal sectional view of the structure illustrated in FIG. 1 showing the signal lights;

DESCRIPTION OF THE PREFERRED EMBODIMENT

Figure 1:
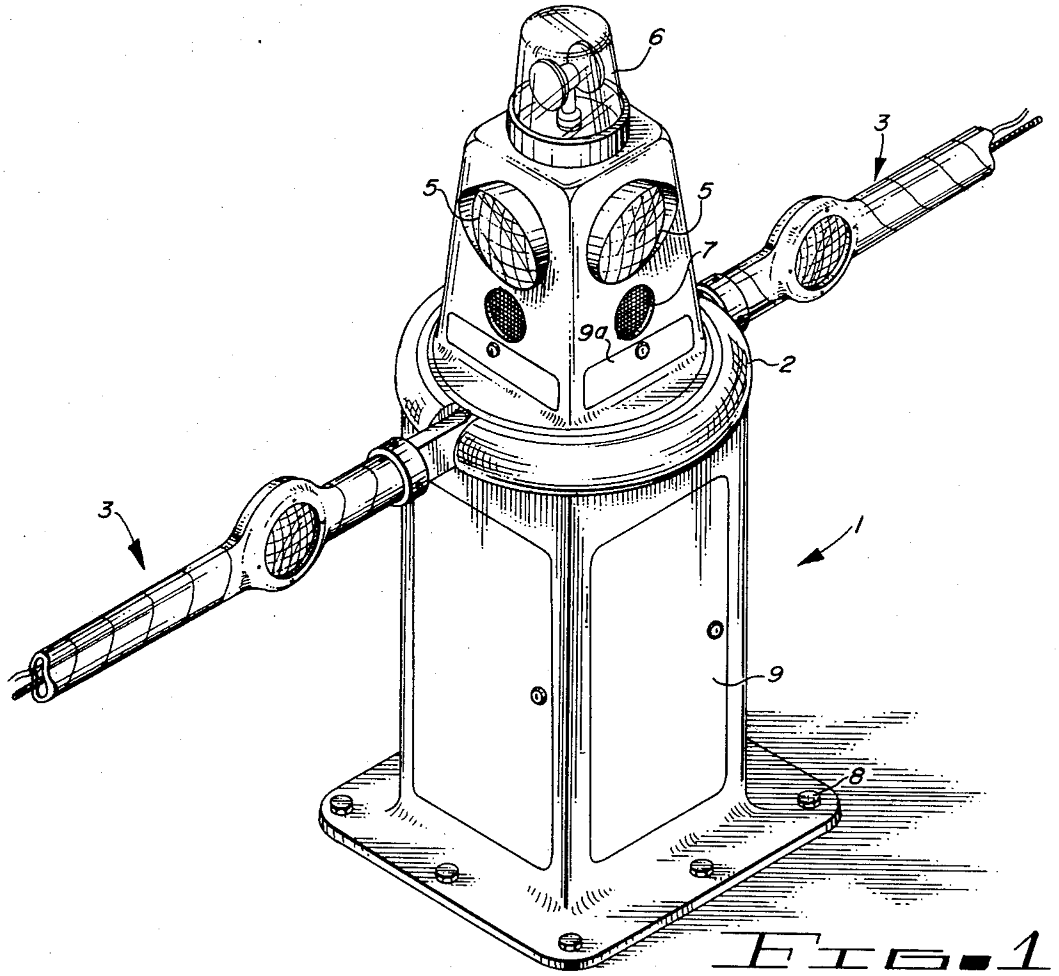
FIG. 1 is a perspective view of one embodiment of the present invention showing the traffic signal arms in their lowered position.
Figure 2:
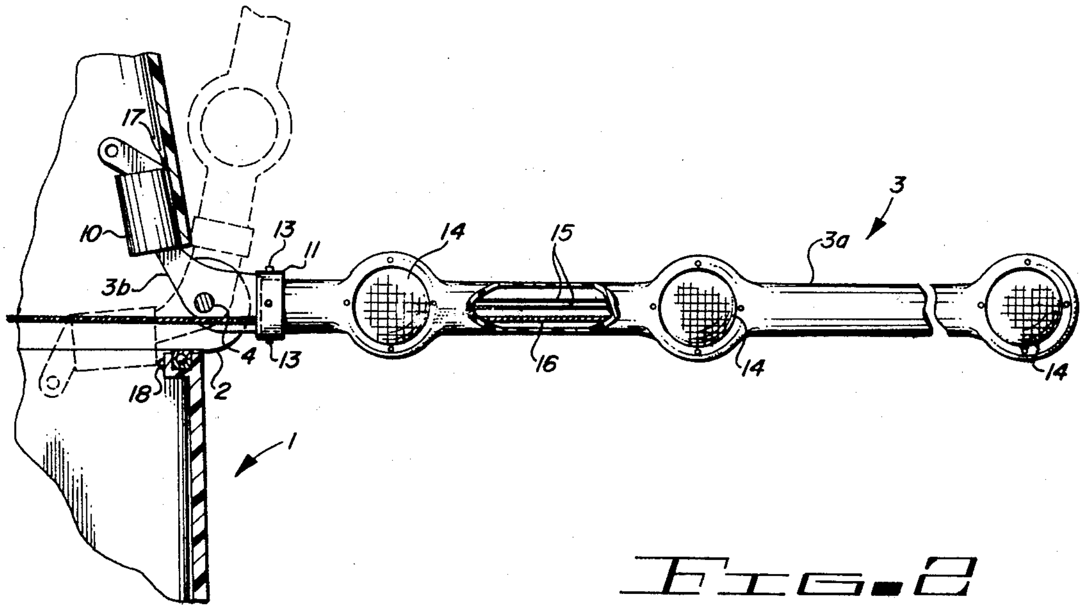
FIG. 2 is a cutaway view of a portion of the device to show operation of the control arms.

The traffic control device shown in FIGS. 1 and 2 comprises a pedestal type signal tower 1 having a rotatable collar 2 mounted thereon and supporting a pair of diametrically opposed arms 3 which are pivotally mounted thereon. Arms 3 are each pivotally mounted on collar 2 by suitable means such as bolts 4 so that they may be moved to horizontal positions shown by solid lines or to vertical positions shown by dotted lines in FIG. 2. Traffic signal lights 5 are positioned one on each of the four sides of the tower 1 with a rotatable yellow beacon 6 and motor therefor, shown in FIG. 3, for rotating the beacon mounted on the top thereof. A siren 7 mounted in tower 1 may be used to provide emergency warning signals if so desired. The tower may be secured in position on the road bed by a plurality of shear bolts 8 which are designed to shear at a strength which provides minimal damage to vehicles which may collide with the tower. Access to mechanical and electronic components in a hollow compartment in signal tower 1 is provided by means of a plurality of key-locked panels 9 and 9a forming doorways into the interior of signal tower 1.

Counterweights 10 shown in FIG. 2 are mounted one on each of the arms for reducing the force needed to raise the arms. Each arm 3 comprises a replaceable end 3a which is pivoted to its crank arm 3b by bolts 4. A replacement collar 11 is attached to crank arm 3b by set screws 13 to provide a method of replacing ends 3a of arms 3 if they are damaged. A plurality of red reflective-type blinker lamps 14 are connected by wires 15 to a source of electrical power, which may be illuminated if it is desirable to flash the lamps. A microswitch 17 mounted in signal tower 1 within the path of movement of at least one of the arms 3 is activated by arms 3 when they reach their corrected horizontal positions. A second microswitch 18 mounted in signal tower 1 and within the path of movement of at least one of the arms 3 is activated by arm 3 when arms 3 reach their vertical positions. Each arm, as shown in FIG. 2, is hollow and has a steel cable 16 extending the length thereof under tension which, when the arm is damaged by fracture, for example, reduces its tension to cause a switch (not shown) to be activated, causing the damaged arms to be retracted verticaly out of the traffic lanes.

Figure 3:
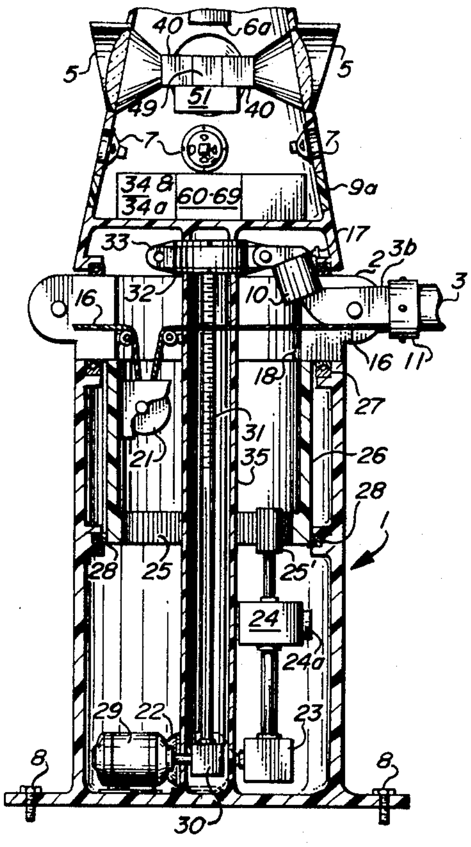
FIG. 3 is a sectional view of the device of FIG. 1.

Details of the electronic and mechanical components, including the cable rewind winch 21 which retracts cable 16 mounted in signal tower 1, are shown in FIG. 3. Rotation of arms 3 in 45° increments on a horizontal axis is provided by a suitable power means comprising an electric motor 22, with a gear-reduction box 23 and a slip clutch 24 arranged to drive an internal gear 25 through a spur gear 25'. Gear 25 is an integral part of a hollow cylinder 26 rotatably mounted within signal tower 1 to the top of which collar 2 is attached. Cylinder 26 is supported in signal tower 1 by bearing surfaces 27 and held in vertical alignment by bearing surfaces 28. Arms 3 are raised and lowered by an electric motor 29 and gear-reduction box 30, which rotates a vertically mounted jackscrew 31 through collar 32 mounted in tower 1 and threadedly arranged therewith. Collar 32 is connected to crank arm 3b of arm 3 by pivotal pin couplings 33. In event of damage to one of arms 3, spring-wound cable rewind winch 21 retracts the damaged arm out of the traffic lane and causes a switch (not shown) to close. This switch provides a signal to move a stepping switch 34 and associated logic hereinafter described in signal tower 1 to a position which provides electric power to energize lamps 14 on the ends of arms 3, to rotate beacon light 6, to actuate siren 7, and to energize motor 29 so that the arms 3 are raised to vertical positions. Stepping switch 34 also provides electrical power for signal light projectors 40*a*–40*d*.

Figure 4A:
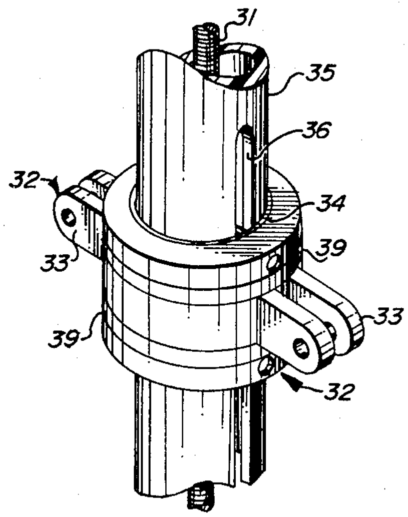
FIGS. 4a and 4b show details of the lift collar which is used to raise and lower the control arms.
Figure 4B:
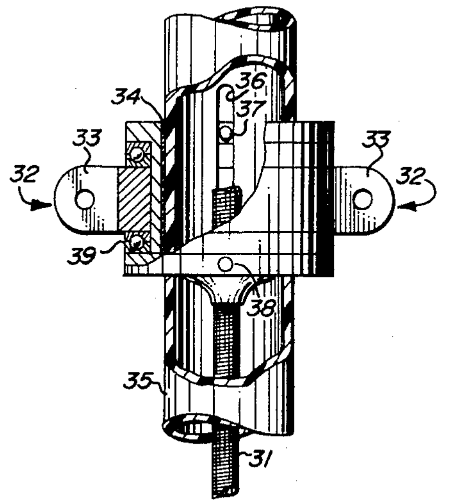

Details of collar 32 are shown in FIGS. 4*a* and 4*b*. As shown therein, collar 32 is supported and driven by jackscrew shaft 31 which is vertically mounted within a vertically positioned cylindrical hollow support shaft 35 forming a part of signal tower 1. Collar 32 slides on its bearing surface 34 which moves vertically along the outside surface of support shaft 35. Shaft 35 has an elongated vertical slot 36 in which guide pins 37 and 38 are mounted to prevent collar 32 from rotating. Upper and lower bearing races 39 provide a means of allowing the rotation of arms 3 attached to pins (not shown) in collar 32.

Figure 7:
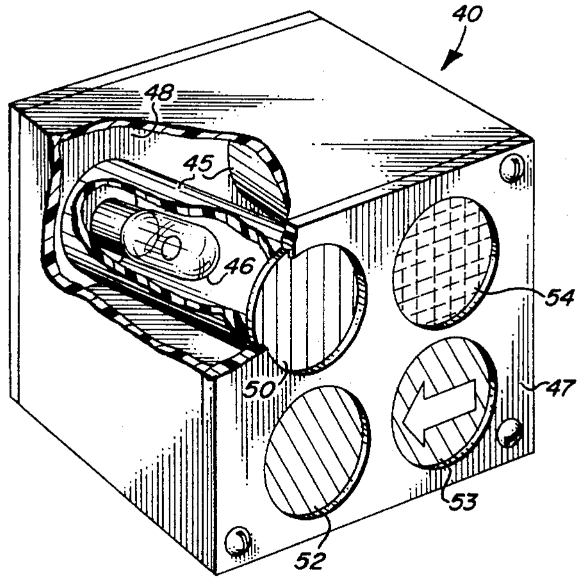
FIG. 7 is a perspective view of a light projector which provides the traffic signals.

FIGS. 3, 6 and 7 disclose details of the signal lights in the traffic control device. Each of the four projectors 40*a*–40*d* includes four horizontally positioned cylinders 45, each having a socket containing a high intensity bulb 46 and a colored lens. Lenses 50, 52, 53 and 54 may be red, yellow, green and green with a left turn arrow, respectively, as shown in FIG. 7. Each lens may be replaced by removing a front panel 47 of each projector and bulbs therein may be replaced by removing a rear panel 48. The position of the projectors in the tower may be seen in FIGS. 3 and 6. Printed circuit boards 49 provide connections to the various bulbs 46.

Figure 8:
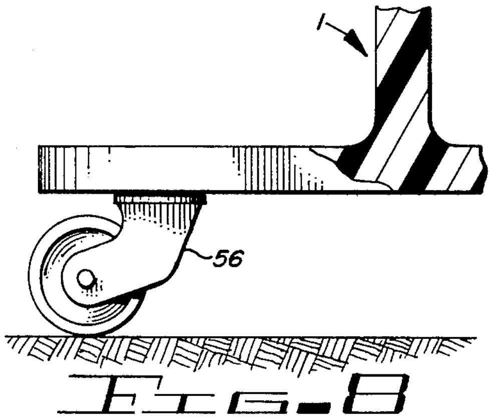
FIG. 8 is a partial view of a modification of the structure shown in FIG. 1 illustrating that the traffic control device may be portable.

FIG. 8 shows a means of mounting tower 1 on casters 46 (only one of which is shown) so that it is portable and may be readily moved into and out of an intersection.

Figure 11:
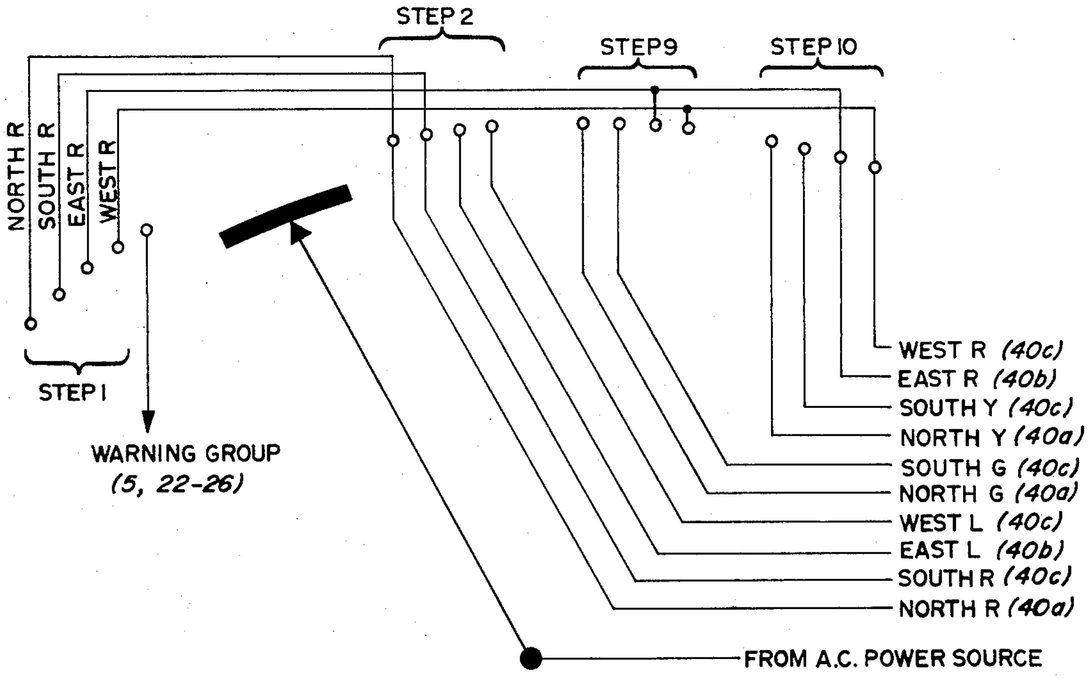
FIG. 11 idscloses details of the operation of the stepping switch for use in the present invention.
Figure 10:
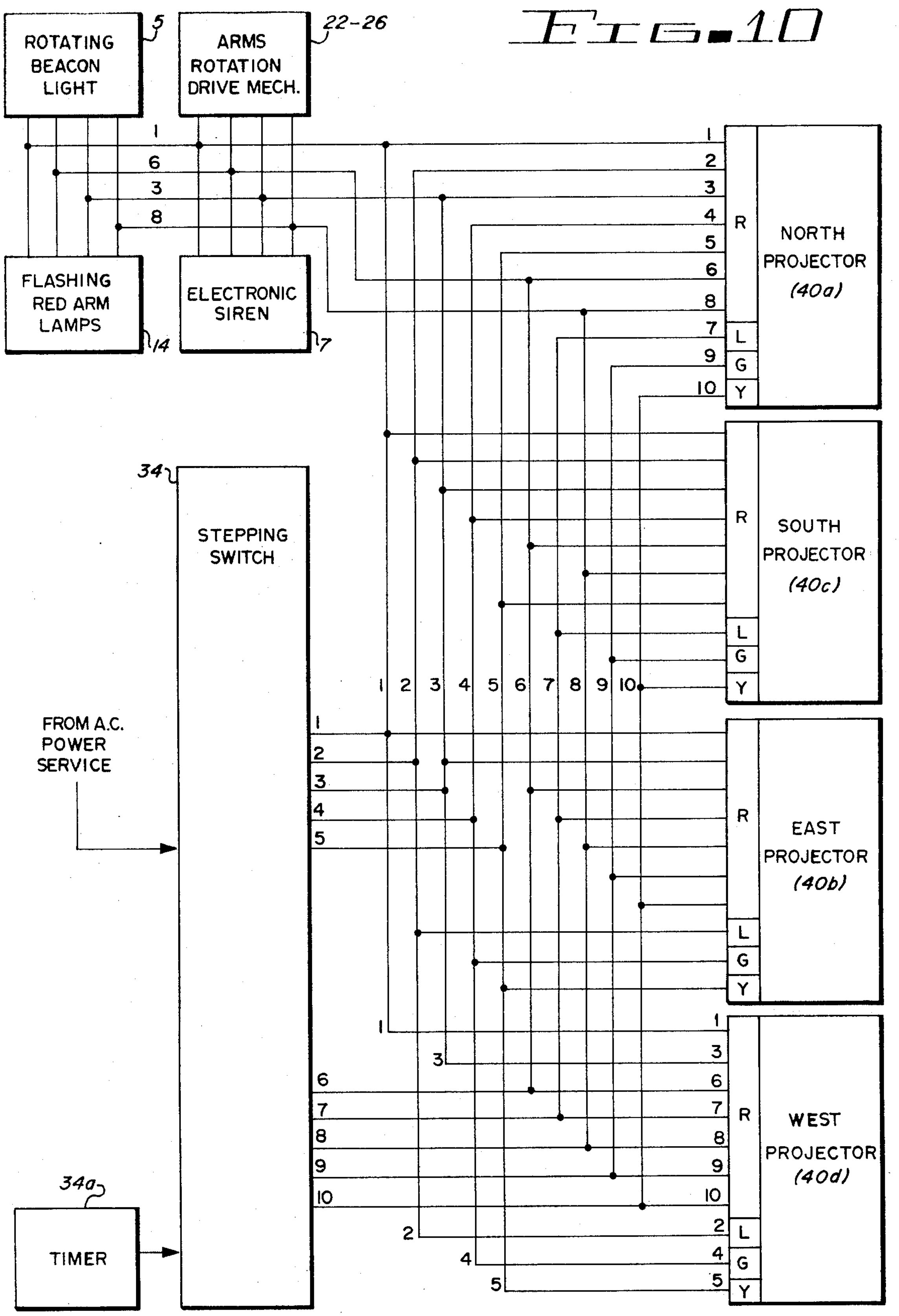
FIG. 10 discloses a circuit which provides the sequential operation of the present invention.

The sequence of operation of signal tower 1 is disclosed in FIGS. 5*a*, 5*b*, 5*c*, 5*d*, 5*e* and 10, with details of a suitable stepping switch for implementing the logic shown in FIG. 10 shown in FIG. 11. FIGS. 5*a*–5*e* show the position of the arms in relation to traffic flow, with FIG. 5*a* showing in chart form the lights which are energized at each position of the arms. When the arms are rotating horizontally to a new position, the lights on all four sides of the tower are red and the rotating yellow beacon light is energized. In the example shown in FIGS. 5*a*–5*e* the four sides of the tower are considered facing north, south, east and west.

In the first step of operation shown in the table in FIG. 5*a*, the arms are rotated clockwise from a north-south direction to a position 45° therefrom. During this movement all of the signal lights are red, the beacon light is rotating and the red lamps in the arms are flashing. When the arms reach the 45° position of step 2, the north and south signal lights remain red, the east and west signal lights indicate a left turn and the beacon and arm lights are off. In step 3 all signal lights are red, the beacon light rotates and arm lights flash as the arms move an additional 45° to the position shown in FIG. 5*c*. In step 4 of FIG. 5*a* the north and south signal lights are red, the east and west signal lights are green and the beacon and arm lamps are off. Steps 5 through 10 are believed obvious from a reading of the chart in FIG. 5*a*.

The sequence of operation of the traffic control device can be controlled by a timing mechanism os the type used in regular traffic signals. These timing mechanisms may be synchronous clock motors which drive the electrical switches of the traffic signal. Electric switches may be readily added to control electrical power to a plurality of lights and motors or instead of controlling power to lights and motors directly, the timing mechanism may provide current to a stepping switch, which in turn controls electrical power to the various lights and motors. One such stepping switch is shown in FIG. 11 for implementing the logic of the block diagram of one embodiment of the present invention shown in FIGS. 9 and 10.

In a typical installation a cable containing a plurality of electrical wires is connected between regular known traffic signal lights at a traffic intersection and the traffic control device of the present invention. If desired, a multi-terminal connector may be fastened to one end of the cable and a mated connector wired to the present inveniton so that the unit can be disconnected for removal to another location and for easy replacement. The logic shown in FIG. 9 controls the lights, motors, sirens of the disclosed traffic control device and additionally controls the lights in the known regular traffic signal lights at the intersection.

Figure 9:
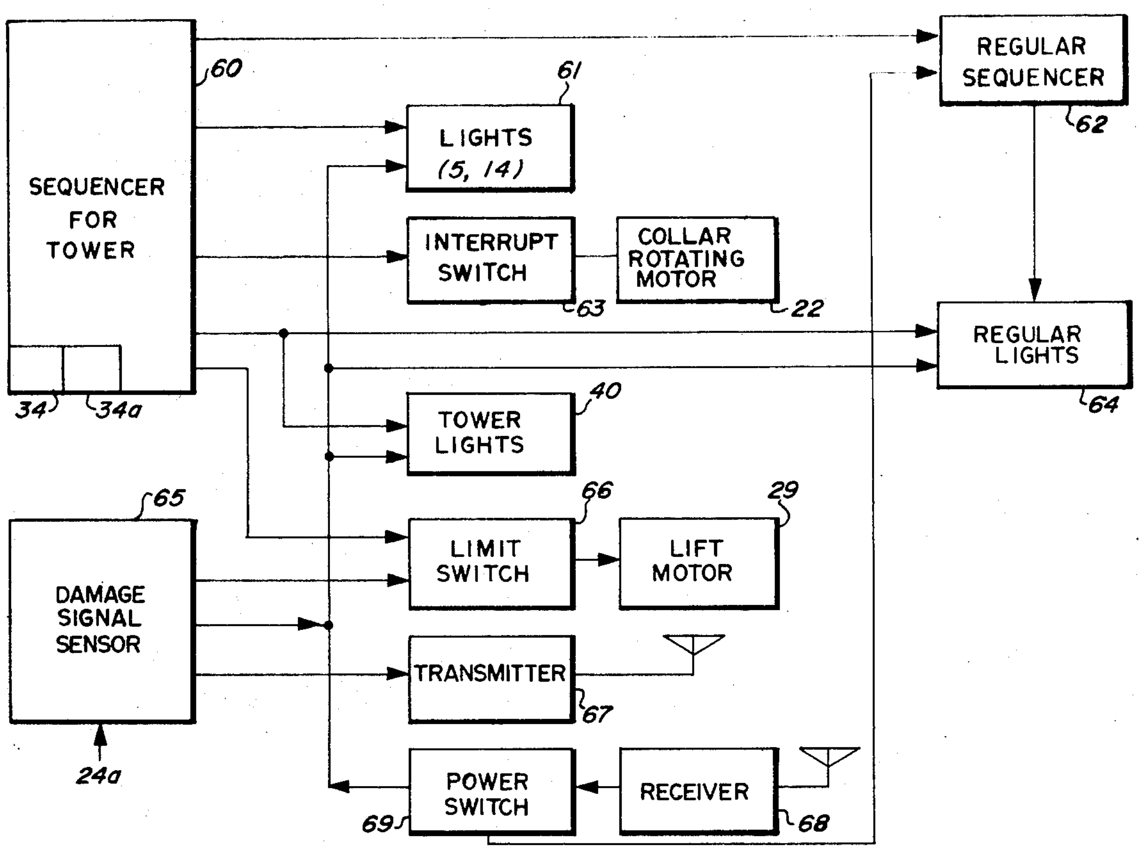
FIG. 9 is a block diagram of the electromechanical portion of the present invention.

Sequencer 60 shown in FIG. 9 forming a part of the logic associated with stepping switch 34 includes a timer 34*a* for stepping switch 34 which controls the electrical power to lights, motors, etc. of signal tower 1. Details of the switch control of stepping switch 34 are shown in FIG. 10 and will be discussed later. Signals from sequencer 60 disable the regular sequencer 62 of the regular traffic intersection lights when the control device is operating. The sequencer 60 provides power to the beacon light 6, the beacon motor 6*a*, the arms lamp 14, the tower lights 5 and the regular traffic signals 64 at the traffic intersection. The sequencer also provides power through an interrupt switch 63 to motor 22 to rotate collar 2 which supports arms 3. The interrupt switch 63 includes a plurality of micro-switches positioned every 45° around the inside of signal tower 1. When the sequencer provides power to motor 22 to rotate the collar on the tower, it is important to stop the rotation at the end of 45°. The micro-switches (not shown) are mounted on the stationary portion of the tower every 45° around the tower. A flexible projection on the rotating collar can be used to activate one of the switches when the collar has moved 45°, thereby causing motor 22 to stop. This ensures that the arms will be properly aligned with the traffic lanes each time the collar stops rotating.

The damage signal sensor 65 causes transmitter 67 to transmit an alarm signal when one of arms 3 is damaged. The alarm signal may be received at a remote location so that repairmen may be alerted and the arms quickly repaired. Sensor 65 also energizes lift motor 29 so that the damaged arms are moved out of the traffic lanes and sensor 65 provides power to arm lamps 14, beacon lights 6, tower projectors 40*a*–40*d*, and the regular traffic lights 64.

A receiver 68 is provided for receiving signals from a remote transmitter, for example, in an emergency vehicle indicating it is approaching the traffic control device. These signals cause receiver 68 to provide a control signal to a power switch 69 to energize beacon light 6, arms lamps 14, tower projectors 40*a*–40*d*, and the regular lights 64. The control signal also disables the regular sequencer 62. Receiver 68 and transmitter 67 of FIG. 9 may be replaced by a known transceiver.

Details of operation of the circuit of FIG. 9 are shown in FIG. 10. The numbered steps of operation of the stepping switch 34 in FIG. 10 are the same as the numbered steps of operation of FIG. 5*a*. Details of the operation of the stepping switch 34 are shown in FIG. 11. When the circuit of FIG. 10 starts at step 1 of FIG. 5*a* the arm of the stepping switch in FIG. 11 supplies electrical power to the five contacts 1. These contacts provide power to the north red, south red, east red and west red lights and to a warning group which includes beacon light 6, the arms rotation motor 22, the flashing red arm lamps 14 and the electronic siren 7. The wiring leads in FIG. 10 are drawn in a circuit arrangement which makes it easier to follow the sequence of operation. For example, leads from steps 1, 2, 3, 4, 5, 6 and 8 are shown connected to the north red light as this light is energized during each of these steps of operation. In the actual wiring, as shown in FIG. 11, only one lead is connected to the north red light, but seven different contacts in the stepping switch are connected together.

It should be recognized that if a vehicle is stalled between the arms 3 of the traffic signal device and rotation of the arms by motor 22 occurs, arms 3 will contact the vehicle and further effort of the motor 22 to turn the arms will cause clutch 24 to slip. If clutch 24 continues to slip it will heat up and a bi-metallic switch or temperature sensor 24*a* mounted thereon could close a switch, thereby transmitting a signal to damage signal sensor 65 which would energize lift motor 29 and raise the arms 3 out of the traffic lanes. Such action would also cause tramsitter 67 to alert a remote station of the stalled vehicle.

While the principles of the invention have now been made clear in an illustrative embodiment, there will be many obvious modification of the structure, proportions, materials and components without departing from those principles. The appended claims are intended to cover any such modifications.

What is claimed is:

1. A traffic control device for use with a source of electrical power, said device comprising:
- a signal tower,
- a pair of signal arms,
- a collar, said collar being rotatably mounted on said tower, said arms being pivotally connected to said collar,
- means coupled to said collar for rotation thereof in a horizontal plane,
- means connected to said arms for pivotal movement thereof toward a vertical position,
- a plurality of signal lights, said lights being mounted in said signal tower, and
- means for coordinating the enrgizing of said signal lights with the positioning of said arms, said coordinating means being coupled to said lights, to said means for rotating said collar and to said means for pivoting said arms.

2. A traffic control device as defined in claim 1 including:
- a plurality of blinker lamps, said blinker lamps being mounted on said arms, and
- means for connecting said blinker lamps to a source of electrical power when said arms are moving.

3. A traffic control device for use with use with a source of electrical power as defined in claim 1 wherein said coordinating means comprises:
- a plurality of electrical contacts,
- means for sequentially connecting said source to said electrical contacts, and
- means for connecting a corresponding one of said electrical contacts to said light, to said means for moving said arms and to said means for rotating said collar.

4. A traffic control device as defined in claim 1 including:
- a sensor for detecting damage to said signal arms,
- a pluraity of blinker lamps, said lamps being coupled to said sensor, said sensor causing said lamps to be energized when said arms are damaged, and
- spring means connected to said arms for pulling said arms out of traffic lanes when said arms are damaged.

5. A traffic control device adapted for use in conjunction with regular other traffic lights and with a source of electrical power, said device comprising:
- a sequencer having a plurality of output leads for connecting said source in a predetermined sequence to said output leads,
- a signal tower,
- a collar rotatably mounted on said tower,
- a pair of signal arms pivotally mounted on said collar,
- means coupled to said collar for rotation thereof in a horizontal plane, said rotating means being connected to a first output lead of said sequencer,
- means connected to said arms for pivotal movement thereof toward a vertical position, said means for rotating said arms being connected to a second output lead of said sequencer, and a plurality of signal lights mounted in said tower, each of said lights being connected to a corresponding different one of said output leads of said sequencer.

6. A traffic control device as defined in claim 5 including:

a plurality of blinker lamps, said lamps being mounted in said arms, said blinker lamps being connected to a third output lead of said sequencer.

7. A traffic control device as defined in claim 6 wherein:

said sequencer is connected to the regular traffic lights to disable said regular traffic light when said traffic control device is being operated and controlling said regular traffic lights when controls of the regular traffic light are disabled.

8. A traffic control device as defined in claim 5 including:

a sensor for detecting damage to said signal arms, said sensor providing a damage signal when said arms are damaged, said sensor being coupled to said means for moving said arms to raise said arms, and a plurality of blinker lamps, said sensor being coupled to said lamps to energize said lamps when said arms are damaged.

9. A traffic control device as defined in claim 5 including:

means for receiving emergency radio signals, said receiving means developing an emergency control signal when energized, and a power switch coupling said source, said blinker lamps and said signal lights, said emergency control signal causing said power switch to operate to connect said blinker lamps and said signal lights to said source.

10. A traffic control device as defined in claim 5 including:

a sensor for detecting damage to said signal arms and providing a signal when said arms are damaged, which signal is coupled to said means for moving said arms causing said means to raise said arms, a plurality of blinker lamps, said sensor being coupled to said lamps causing said lamps to be energized when said signal is generated, and a radio transmitter, said transmitter being coupled to said sensor for transmitting an alarm signal when said arms are damaged.

11. A traffic control device as defined in claim 1 in further combination with:

a slip clutch connected between said collar and said means for rotating said collar, a sensor mounted on said slip clutch, and means interconnecting said sensor and said means for pivotal movement of said arms for energizing said latter means upon receiving a signal from said sensor indicating a clutch slipping action of said slip clutch.

* * * * *